US008999558B2

(12) United States Patent
Rust, III et al.

(10) Patent No.: US 8,999,558 B2
(45) Date of Patent: Apr. 7, 2015

(54) THREE-DIMENSIONAL BATTERIES AND METHODS OF MANUFACTURING THE SAME

(75) Inventors: Harrold Jones Rust, III, Alamo, CA (US); Ashok Lahiri, Cupertino, CA (US); Murali Ramasubramanian, Fremont, CA (US); Robert Spotnitz, Pleasanton, CA (US)

(73) Assignee: Enovix Corporation, Fremont, CA (US)

( * ) Notice: Subject to any disclaimer, the term of this patent is extended or adjusted under 35 U.S.C. 154(b) by 1566 days.

(21) Appl. No.: 12/013,388

(22) Filed: Jan. 11, 2008

(65) Prior Publication Data

US 2011/0111283 A1    May 12, 2011

Related U.S. Application Data

(60) Provisional application No. 60/884,836, filed on Jan. 12, 2007, provisional application No. 60/884,828, filed on Jan. 12, 2007, provisional application No. 60/884,846, filed on Jan. 12, 2007.

(51) Int. Cl.
  *H01M 10/04* (2006.01)
  *H01M 4/04* (2006.01)
  *H01M 6/40* (2006.01)

(52) U.S. Cl.
  CPC .......... *H01M 4/0438* (2013.01); *H01M 4/0423* (2013.01); *H01M 4/0426* (2013.01); *H01M 4/0428* (2013.01); *H01M 4/049* (2013.01); *H01M 6/40* (2013.01); *H01M 10/0472* (2013.01)

(58) Field of Classification Search
  CPC ............... H01M 10/4235; H01M 2004/025; H01M 10/04; H01M 10/0472
  USPC ...................... 429/40, 209, 290.01
  See application file for complete search history.

(56) References Cited

U.S. PATENT DOCUMENTS 4,820,599 A    4/1989   Furukawa et al.
4,996,129 A    2/1991   Tuck
(Continued)

FOREIGN PATENT DOCUMENTS

CA    02388711 A1    5/2001
JP    2008153033 A    7/2008
(Continued)

OTHER PUBLICATIONS

International Search Authority, PCT International Search Report and Notification of Transmittal, Int'l App. No. PCT/US 08/50942, May 18, 2008.
(Continued)

*Primary Examiner* — Cynthia H Kelly
*Assistant Examiner* — Stephen Yanchuk
(74) *Attorney, Agent, or Firm* — Bryan Cave LLP

(57) ABSTRACT

Various methods and apparatus relating to three-dimensional battery structures and methods of manufacturing them are disclosed and claimed. In certain embodiments, a three-dimensional battery comprises a battery enclosure, and a first structural layer within the battery enclosure, where the first structural layer has a first surface, and a first plurality of conductive protrusions extend from the first surface. A first plurality of electrodes is located within the battery enclosure, where the first plurality of electrodes includes a plurality of cathodes and a plurality of anodes, and wherein the first plurality of electrodes includes a second plurality of electrodes selected from the first plurality of electrodes, each of the second plurality of electrodes being in contact with the outer surface of one of said first plurality of conductive protrusions. Some embodiments relate to processes of manufacturing energy storage devices with or without the use of a backbone structure or layer.

37 Claims, 14 Drawing Sheets

(56) References Cited

U.S. PATENT DOCUMENTS

| | | | |
|---|---|---|---|
| 5,294,504 A | 3/1994 | Otagawa | |
| 5,993,990 A | 11/1999 | Kanto et al. | |
| 6,432,585 B1 | 8/2002 | Kawakami | |
| 6,495,283 B1* | 12/2002 | Yoon et al. | 429/162 |
| 6,498,406 B1 | 12/2002 | Horiuchi | |
| 6,821,673 B1* | 11/2004 | Hamada et al. | 429/160 |
| 6,878,173 B2 | 4/2005 | Miyahisa | |
| 7,153,609 B2 | 12/2006 | Kubo et al. | |
| 2002/0034685 A1 | 3/2002 | Sato et al. | |
| 2002/0039283 A1* | 4/2002 | Nakamura et al. | 361/736 |
| 2004/0185336 A1* | 9/2004 | Ito et al. | 429/152 |
| 2004/0241540 A1* | 12/2004 | Tsutsumi et al. | 429/122 |
| 2005/0079418 A1 | 4/2005 | Kelley et al. | |
| 2006/0154141 A1 | 7/2006 | Salot et al. | |
| 2007/0059584 A1* | 3/2007 | Nakano et al. | 429/40 |
| 2007/0172732 A1 | 7/2007 | Jung et al. | |
| 2007/0243460 A1 | 10/2007 | Carlson et al. | |
| 2008/0032170 A1 | 2/2008 | Wainright et al. | |
| 2008/0081257 A1 | 4/2008 | Yoshida et al. | |
| 2009/0142656 A1 | 6/2009 | Nathan et al. | |
| 2010/0119939 A1 | 5/2010 | Misumi et al. | |
| 2011/0020701 A1 | 1/2011 | Park et al. | |
| 2011/0111283 A1 | 5/2011 | Rust, III et al. | |
| 2011/0171518 A1 | 7/2011 | Dunn et al. | |

FOREIGN PATENT DOCUMENTS

| | | |
|---|---|---|
| JP | 2008153034 A | 7/2008 |
| JP | 2008153035 A | 7/2008 |
| JP | 2008153036 A | 7/2008 |
| WO | 2008030215 | 3/2008 |
| WO | 2008072638 A1 | 6/2008 |
| WO | 2011154862 | 12/2011 |

OTHER PUBLICATIONS

Chan, High-performance lithium battery anodes using silicon nanowires, Nature Nanotechnology, vol. 3, pp. 31-35, Jan. 2008.

Serpo, A tenfold improvement in battery life?, ZDNet News, Jan. 15, 2008.

Long et. al., "Three-Dimensional Battery Architectures," Chemical Reviews, (2004), 104, 4463-4492.

Chang Liu, Foundations of MEMS, Chapter 10, pp. 1-55 (2006).

Kanamura et. al., "Electrophoretic Fabrication of LiCoO2 Positive Electrodes for Rechargeable Lithium Batteries," J. Power Sources, 97-98 (2001) 294-297.

Caballero et al., "LiNi0.5Mn1.5O4 thick-film electrodes prepared by electrophoretic deposition for use in high voltage lithium-ion batteries," J. Power Sources, 156 (2006) 583.

Wang and Cao, "Li+-intercalation Electrochemical/chromic Props of Vanadium Pentoxide Films by Sol Electrophoretic Deposition," Electrochimica Acta, 51, (2006), 4865-4872.

Nishizawa et al., "Template Synth of Polypyrrole-Coated Spinel LiMn2O4 Nanotubules and Props as Cathode Active Materials for Li Batteries," J.Electrochem.Soc., 1923-1927(1997).

Shembel et. al., "Thin Layer Electrolytic Molybdenum Oxysulfides for Li Secondary Batteries With Liquid and Polymer Electrolytes," 5th Adv Batteries and Accumulators (2004).

Kobrin et. al., "Molecular Vapor Deposition—An Improved Vapor-Phase Deposition Technique of Molecular Coatings for MEMS Devices," SEMI Tech Symp:(STS,ISM), 2004.

Green et al., "Structured Silicon Anodes for Li Battery Applications," Electrochem & Solid State Letters, 6, 2003 A75-A79.

Shin et al., "Porous Silicon Negative Electrodes for Rechargeable Lithium Batteries," J. Power Sources, 139 (2005) 314-320.

Broussely and Archdale, "Li-ion batteries and portable power source prospects for the next 5-10 years," J. Power Sources, 136, (2004), 386-394.

V. Lehmann, "The Physics of Macropore Formation in Low Doped n-Type Silicon," J. Electrochem. Soc. 140 (1993), 10, 2836-2843.

Vyatkin et al., "Random and Ordered Macropore Formation in p-Type Silicon," J. Electrochem. Soc. 149, 1, G70-G76 (2002).

van den Meerakker et al., "Etching of Deep Macropores in 6 in. Si Wafers," J. Electrochem. Soc. 147, 7, 2757-2761 (2000).

P.G. Balakrishnan, R. Ramesh, and T. Prem Kumar, "Safety mechanisms in lithium-ion batteries," Journal of Power Sources, 2006, 155, 401-414.

P. Arora and Z. Zhang, "Battery separators," Chem. Rev., 2004, 104, 4419-4462.

Golodnitsky et al., "Advanced materials for the 30 microbattery," 2006, Journal of Power Sources, 153, pp. 281-287.

Chamran et al., "Three-dimensional nickel-zinc microbatteries," 2006, MEMS, 22-26, pp. 950-953.

Fu, Y. et al., Investigation of Aspect Ratio of Hole Drilling from Micro to Nanoscale via Focused Ion Beam Fine Milling, Proceedings of SMA Symposium, 2005, 1-5.

Oukassi, S. et al., Microfabricated Solid State Thin Film Lithium Batteries, Mater. Res. Soc. Symp. Proc. vol. 973 © 2007 Materials Research Society, 0973-BB01-02, 7 pgs.

* cited by examiner

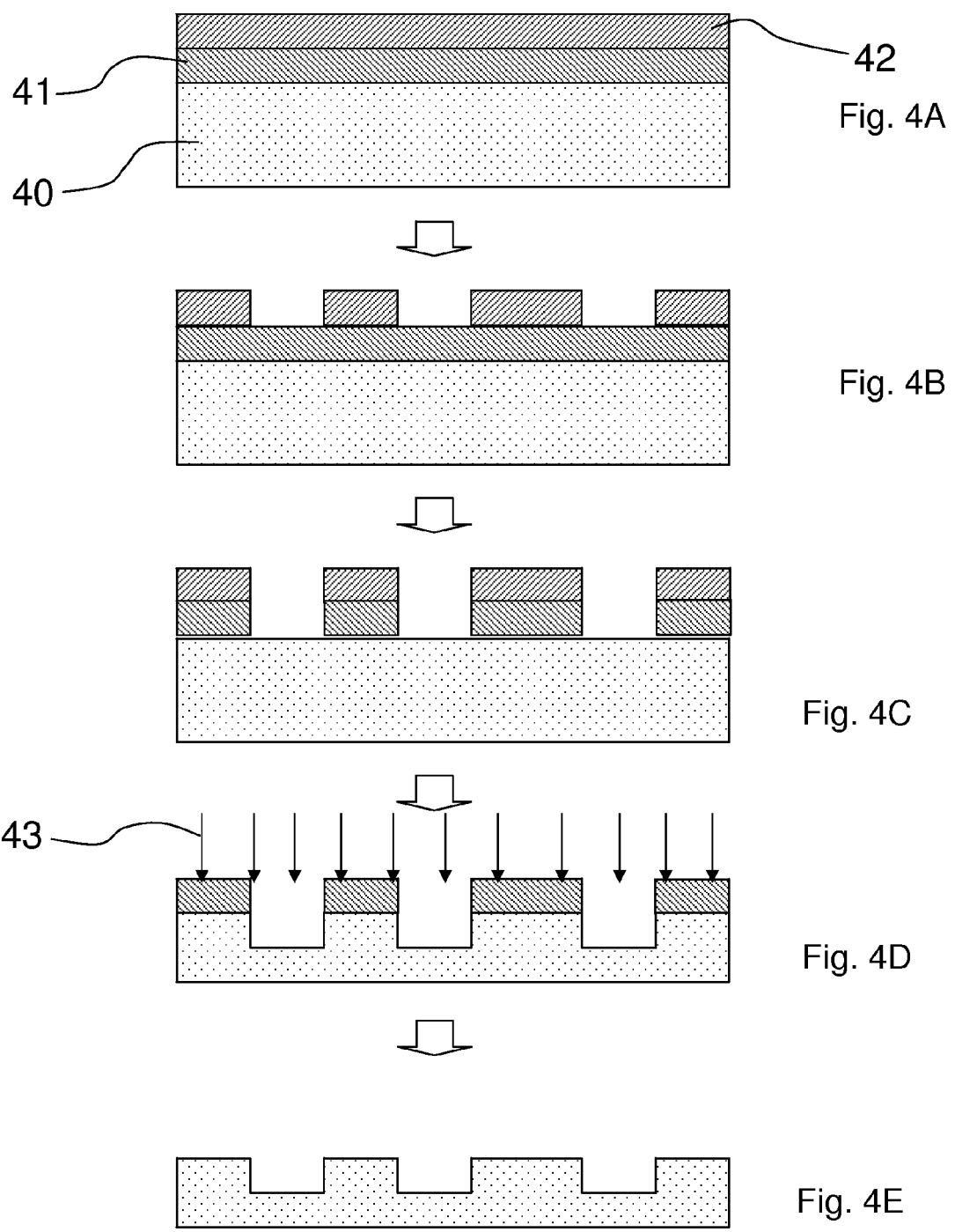

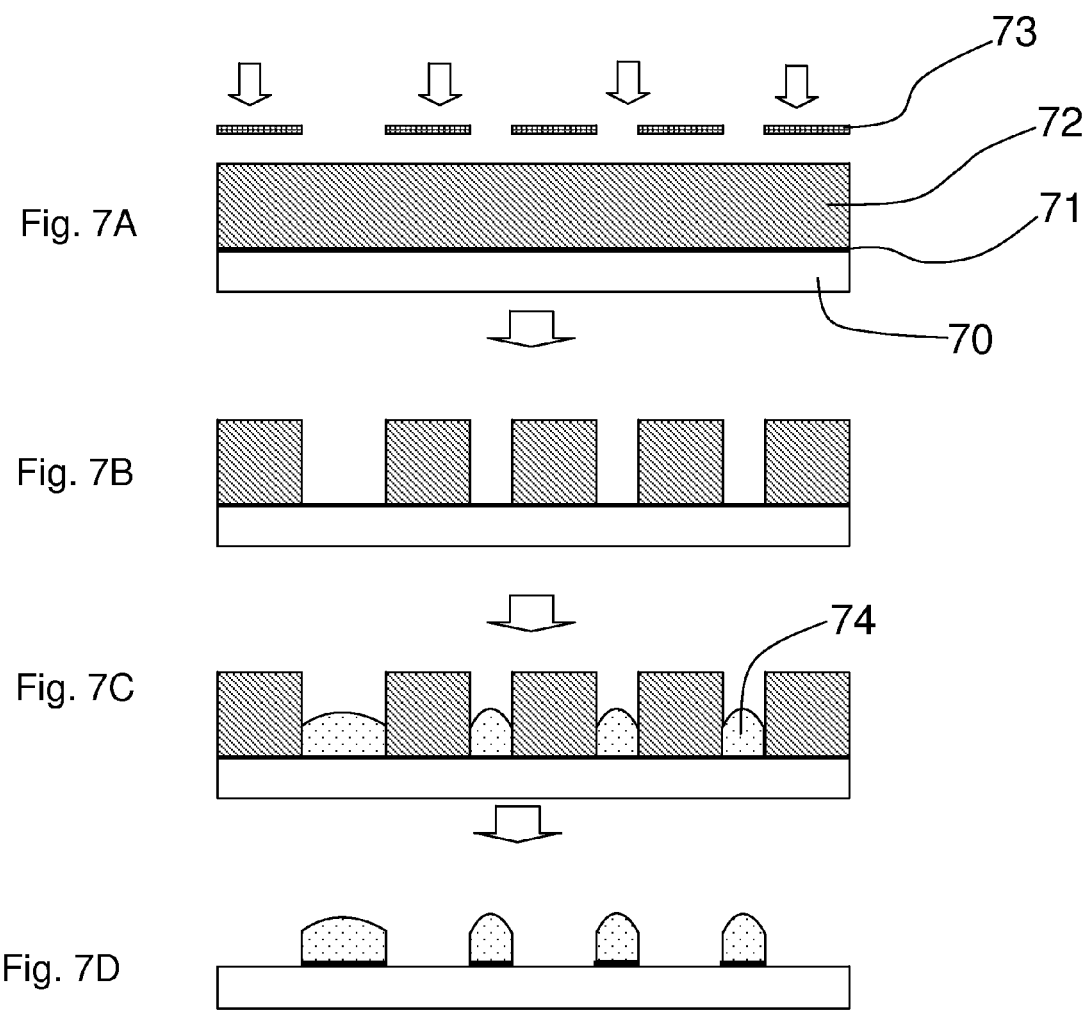

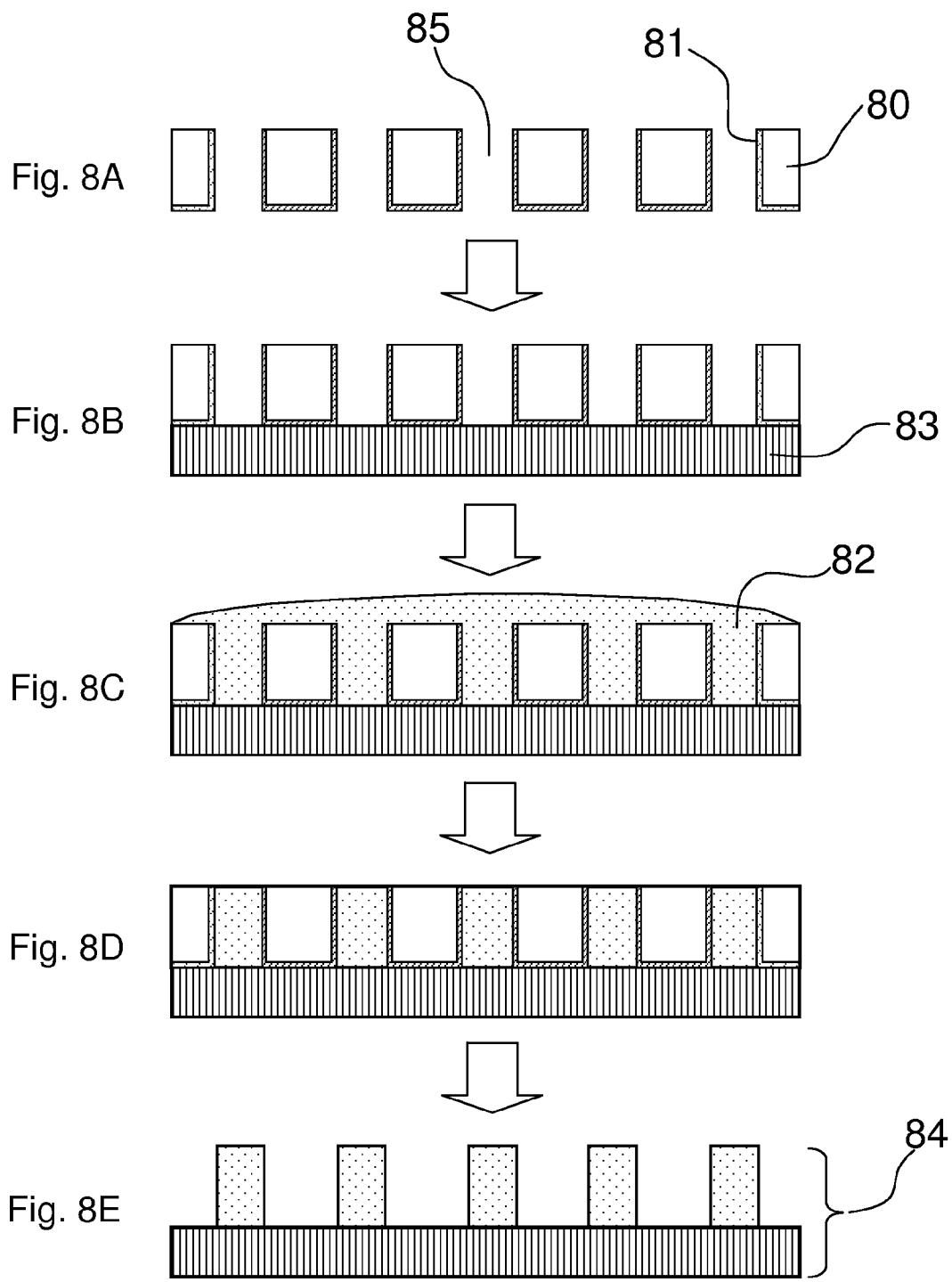

THREE-DIMENSIONAL BATTERIES AND METHODS OF MANUFACTURING THE SAME

CROSS-REFERENCE TO RELATED APPLICATIONS

This application claims priority under 35 U.S.C. section 119(e) to: (i) U.S. Provisional Application No. 60/884,836, entitled "Electrodes For Three Dimensional Lithium Batteries And Methods Of Manufacturing Thereof," filed on Jan. 12, 2007; (ii) U.S. Provisional Application No. 60/884,828, entitled "Three-Dimensional Batteries and Methods of Manufacturing Using Backbone Structure," filed on Jan. 12, 2007; and (iii) U.S. Provisional Application No. 60/884,846, entitled "Three-Dimensional Lithium Battery Separator Architectures," filed on Jan. 12, 2007; all of which are hereby incorporated by reference herein in their entirety.

BACKGROUND OF THE INVENTION

1. Technical Field of the Invention

Implementations consistent with the principles of the invention generally relate to the field of battery technology, more specifically to three-dimensional energy storage systems and devices, such as batteries and capacitors, and methods of manufacturing thereof.

2. Background

Existing energy storage devices, such as batteries, fuel cells, and electrochemical capacitors, typically have two-dimensional laminar architectures (e.g., planar or spiral-wound laminates) with a surface area of each laminate being roughly equal to its geometrical footprint (ignoring porosity and surface roughness).

A lithium battery is a highly desirable energy source due to its high energy density, high power, and long shelf life. Examples of lithium batteries include non-aqueous batteries such as lithium-ion and lithium polymer batteries. A separator between positive and negative electrodes of a lithium battery constitutes an important component of the battery. Separators for conventional, planar lithium ion batteries are typically solid micro-porous polyolefin films that are assembled in a sheet form and rolled in the form of a cathode/separator/anode/separator stack. This stack is rolled tightly and inserted into a can, filled with electrolyte, and then sealed.

FIG. 1 shows a cross sectional view of an existing energy storage device, such as a lithium-ion battery. The battery 15 includes a cathode current collector 10, on top of which a cathode 11 is assembled. This layer is covered by a separator 12, over which an assembly of an anode current collector 13 and an anode 14 are placed. This stack is sometimes covered with another separator layer (not shown) above the anode current collector 13, and is rolled and stuffed into a can to assemble the battery 15. During a charging process, lithium leaves the cathode 11 and travels through the separator 12 as a lithium ion into the anode 14. Depending on the anode 14 used, the lithium ion either intercalates (e.g., sits in a matrix of an anode material without forming an alloy) or forms an alloy. During a discharge process, the lithium leaves the anode 14, travels through the separator 12 and passes through to the cathode 11.

Three-dimensional batteries have been proposed in the literature as ways to improve battery capacity and active material utilization. It has been proposed that a three-dimensional architecture may be used to provide higher surface area and higher energy as compared to a two dimensional, laminar battery architecture. There is a benefit to making a three-dimensional energy storage device due to the increased amount of energy that may be obtained out of a small geometric area.

The following references may further help to illustrate the state of the art, and are therefore incorporated by reference as non-essential subject matter herein: Long et. al., "Three-Dimensional Battery Architectures," *Chemical Reviews*, (2004), 104, 4463-4492; Chang Liu, FOUNDATIONS OF MEMS, Chapter 10, pages 1-55 (2006); Kanamura et. al., "Electrophoretic Fabrication of $LiCoO_2$ Positive Electrodes for Rechargeable Lithium Batteries," *Journal of Power Sources*, 97-98 (2001) 294-297; Caballero et al., "$LiNi_{0.5}Mn_{1.5}O_4$ thick-film electrodes prepared by electrophoretic deposition for use in high voltage lithium-ion batteries," *Journal of Power Sources*, 156 (2006) 583-590; Wang and Cao, "$Li^+$-intercalation Electrochemical/Electrochromic Properties Of Vanadium Pentoxide Films By Sol Electrophoretic Deposition," *Electrochimica Acta*, 51, (2006), 4865-4872; Nishizawa et al., "Template Synthesis of Polypyrrole-Coated Spinel $LiMn_2O_4$ Nanotubules and Their Properties as Cathode Active Materials for Lithium Batteries," *Journal of the Electrochemical Society*, 1923-1927, (1997); Shembel et. al., "Thin Layer Electrolytic Molybdenum Oxysulfides For Lithium Secondary Batteries With Liquid And Polymer Electrolytes," $5^{th}$ *Advanced Batteries and Accumulators, ABA*-2004, Lithium Polymer Electrolytes; and Kobrin et. al., "Molecular Vapor Deposition—An Improved Vapor-Phase Deposition Technique of Molecular Coatings for MEMS Devices," *SEMI Technical Symposium: Innovations in Semiconductor Manufacturing (STS: ISM)*, SEMICON West 2004, 2004 *Semiconductor Equipment and Materials International*.

It would be desirable to make three-dimensional electrochemical energy devices that may provide significantly higher energy and power density, while addressing the above issues or other limitations in the art.

SUMMARY OF THE INVENTION

Various methods and apparatus relating to three-dimensional battery structures and methods of manufacturing them are disclosed and claimed. In certain embodiments, a three-dimensional battery comprises a battery enclosure, and a first structural layer within the battery enclosure, where the first structural layer has a first surface, and a first plurality of conductive protrusions extend from the first surface. A first plurality of electrodes is located within the battery enclosure, where the first plurality of electrodes includes a plurality of cathodes and a plurality of anodes, and wherein the first plurality of electrodes includes a second plurality of electrodes selected from the first plurality of electrodes, each of the second plurality of electrodes being in contact with the outer surface of one of said first plurality of conductive protrusions.

Other aspects and advantages of the present invention may be seen upon review of the figures, the detailed description, and the claims that follow.

BRIEF DESCRIPTION OF THE DRAWINGS

Some embodiments of the invention are described with reference to the following figures.

FIGS. 4A-4E depict a schematic representation of a process for manufacturing a backbone structure using a subtractive reactive ion etch process, according to an embodiment of the invention.

FIGS. 7A-7D depict a schematic representation of a process for manufacturing a backbone structure using an additive electrochemical deposition, electroless deposition, or electrophoretic deposition process, according to an embodiment of the invention.

FIGS. 8A-8E depict a schematic representation of a process for manufacturing a backbone structure using an additive extrusion process, according to an embodiment of the invention.

DETAILED DESCRIPTION

Figure 1:
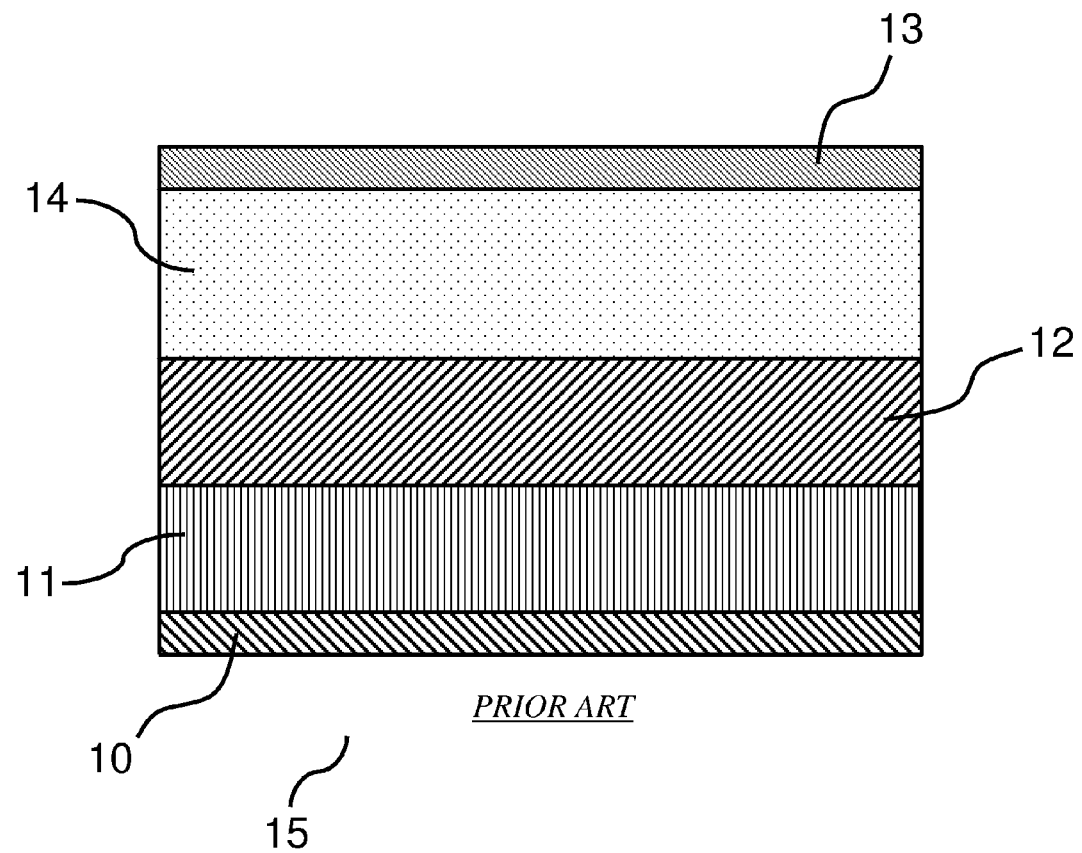
FIG. 1 is a generic cross-section of an existing two-dimensional energy storage device such as a lithium ion battery.

Certain embodiments of the invention relate to the design of a three-dimensional lithium-ion battery. Existing energy storage devices, such as batteries, fuel cells, and electrochemical capacitors, typically have two-dimensional laminar architectures (e.g., planar or spiral-wound laminates) with a surface area of each laminate being roughly equal to its geometrical footprint (ignoring porosity and surface roughness). A three-dimensional energy storage device can be one in which an anode, a cathode, and/or a separator are non-laminar in nature. For example, if electrodes protrude sufficiently from a backplane to form a non-laminar active battery component, then the surface area for such a non-laminar component may be greater than twice the geometrical footprint of its backplane. In some instances, given mutually orthogonal X,Y,Z directions, a separation between two constant-Z backplanes should be at least greater than a spacing between electrodes in an X-Y plane, divided by the square root of two.

Some embodiments of the invention relate to the use of a backbone structure for the manufacture of three-dimensional energy storage devices, such as batteries, capacitors, and fuel cells. The backbone structure may be used for the purpose of providing mechanical stability, electrical connectivity, and increased surface area per unit geometrical area. By way of example, the backbone structure may be made in the shape of pillars by wire-bonding aluminum on a flat substrate, which may be subsequently coated with a cathode or anode material for the purpose of assembling a battery. Examples of backbone formation using various materials, shapes, and methodologies are presented herein, among other embodiments.

Three-dimensional energy storage devices may produce higher energy storage and retrieval per unit geometrical area than conventional devices. Three-dimensional energy storage devices may also provide a higher rate of energy retrieval than two-dimensional energy storage devices for a specific amount of energy stored, such as by minimizing or reducing transport distances for electron and ion transfer between an anode and a cathode. These devices may be more suitable for miniaturization and for applications where a geometrical area available for a device is limited and/or where energy density requirement is higher than what may be achieved with a laminar device.

Some embodiments of the invention include a mechanically stable, electrically conductive backbone structure that ends up being a part of the final assembled energy storage device. A backbone material typically does not take an active part in electrochemical reactions of the energy storage device, and may enhance mechanical and electrical robustness.

The backbone material may also act as a high surface area substrate for manufacturing the high surface area electrochemical device. Mechanical robustness may increase the lifetime of the device, since active materials that constitute the device are typically porous electrodes with relatively lower mechanical stability. Electrical conductivity may enhance or maintain a power density of the device (e.g., by decreasing resistivity) while also equalizing current distribution between electroactive species.

A backbone structure may be made in any shape that provides higher surface area relative to geometrical area, such as pillars, posts, plates, waves, circles, diamonds, spirals, staircase structures, and so forth. The backbone structure may be made out of any material that may be shaped, such as metals, semiconductors, organics, ceramics, and glasses. The backbone structure may serve to provide: (i) rigidity to active electrodes in an energy storage device, such as anodes and cathodes in a lithium ion battery; (ii) electrical connectivity to tall three-dimensional structures; and (iii) increased surface area per unit geometrical area. Desirable materials include semiconductor materials such as silicon and germanium. Carbon-based organic materials may also be used to form backbone structures for three-dimensional shaping. Metals, such as aluminum, copper, nickel, cobalt, titanium, and tungsten, may also be used for backbone structures.

In some embodiments, a backbone structure is made out of a metal, semiconductor, organic material, ceramic, or glass using a subtractive formation technique. These materials may be processed by reactively etching a substrate using a selective etch mask and a plasma etch process. Alternatively, or in conjunction, electrochemical etching, stamping, or electrical discharge machining may be used to selectively remove material preferentially in areas where these materials are not desired.

In other embodiments, a backbone structure is made out of a metal, semiconductor, organic, ceramic, or glass using an additive formation technique. These materials may be processed by making a sacrificial mold using a technique such as conventional lithography, and depositing a backbone material using techniques such as electrochemical deposition, electroless deposition, electrophoretic deposition, vacuum assisted filling, stencil assisted filling, and so is forth. In certain cases, the backbone structure may be assembled directly using a wirebonding process. In other cases, the backbone structure may be made on a flat plate using conventional lithography and deposition techniques, and subsequently assembled by "pick and place" and soldering or gluing techniques.

In other embodiments, a backbone material may be shaped using printing techniques, such as three-dimensional printing and inkjet printing, to form a backbone structure using single or multiple layers of printing to obtain a desired shape and thickness. Alternatively, or in conjunction, the backbone material may be assembled in the form of layered sheets, with sacrificial layers deposited in between. After stacking of the sheets is substantially complete, a resulting structure is cut into pieces of a desired height, assembled together, and the sacrificial material is released to provide the backbone structure.

In the case of an electrically conductive backbone structure, an active material may be directly assembled on top of and around the backbone structure by various techniques, such as electrochemical deposition, electroless deposition, co-deposition in an organic or inorganic matrix, electrophoretic deposition, mechanical filling and compacting, and vacuum assisted flow deposition.

In case of an electrically non-conductive backbone structure, a conducting layer may be deposited by various techniques, such as electrochemical or electroless deposition, vapor assisted vacuum deposition such as Atomic Layer Deposition (ALD) and Chemical Vapor Deposition (CVD), sputter deposition, evaporation, and electrophoretic deposition. This conductive layer may be subsequently removed in order to remove an electrical connection between an anode and a cathode. This removal may be accomplished using techniques such as sputter etching, ion milling, and liftoff. In addition, techniques such as chemical dissolution may be used with standard techniques such as lithography to protect areas that do not need to be removed.

Figure 2:
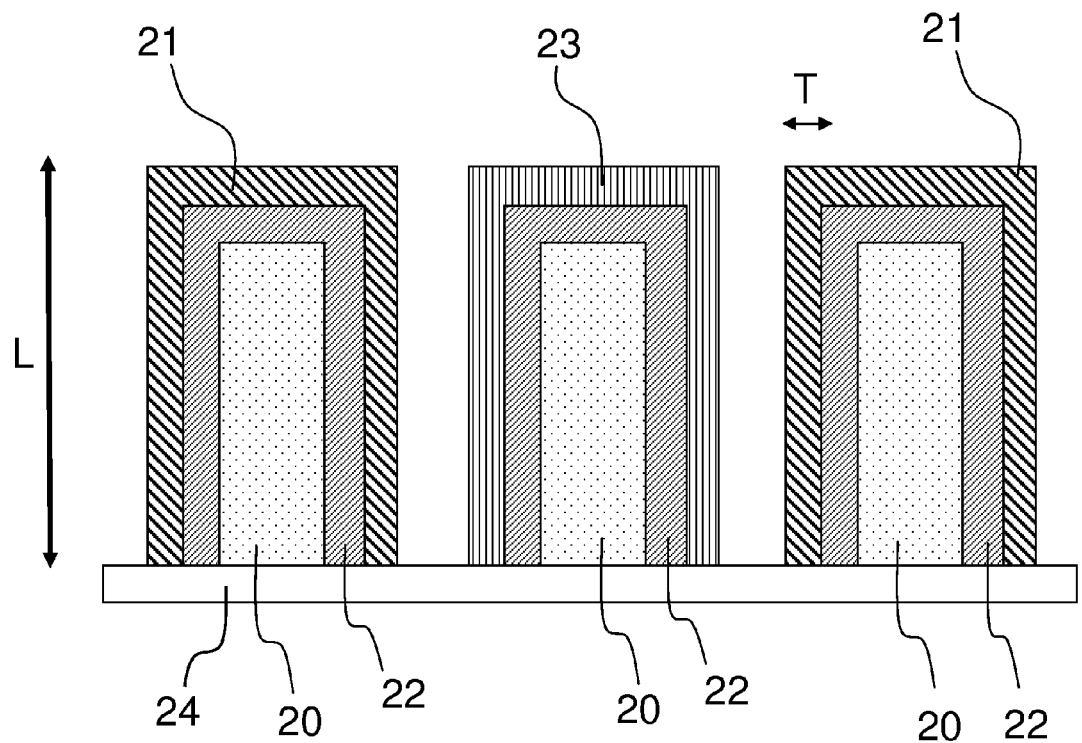
FIG. 2 is a schematic illustration of a backbone structure according to an embodiment of the invention.

FIG. 2 illustrates an exemplary concept of a backbone structure 20 used in the formation of a three-dimensional battery. FIG. 2 shows a cross-sectional schematic of two positive electrodes 21 and a negative electrode 23. In this embodiment, the backbone structure 20 includes a non-conductive base 24 of a common material on which a conductive material 22 has been deposited and removed in the areas where it is not needed in order to separate the electrodes 21 and 23. It is apparent from comparing FIG. 2 and FIG. 1 that a surface area for the electrodes 21 and 23 in FIG. 2 is relatively higher as compared to the surface area for the electrodes shown in FIG. 1, calculating this area as a product of a length L and a thickness T of the electrodes 21 and 23. It should be noted that the thickness, and therefore related properties such as conductivity, of various features (such as electrodes and backbone structure protrusions) according to certain embodiments may be varied locally (e.g., from electrode to electrode or from protrusion to protrusion) based on current-carrying requirements or other relevant performance specifications.

Figure 3A:
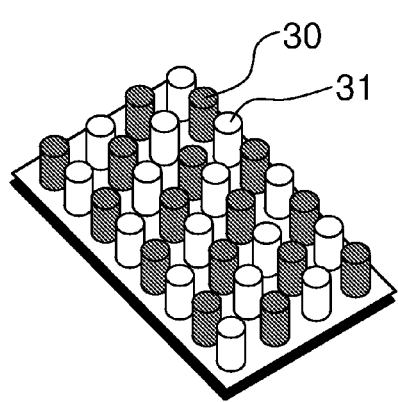
FIGS. 3A-3D are schematic illustrations of some shapes into which backbone structures may be assembled according to certain embodiments of the invention.
Figure 3B:
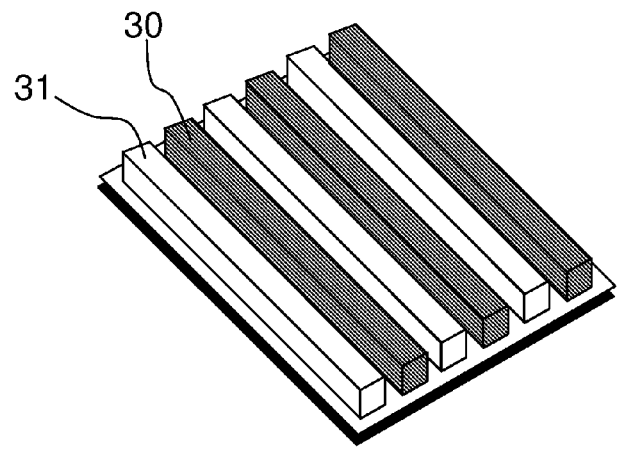
Figure 3C:
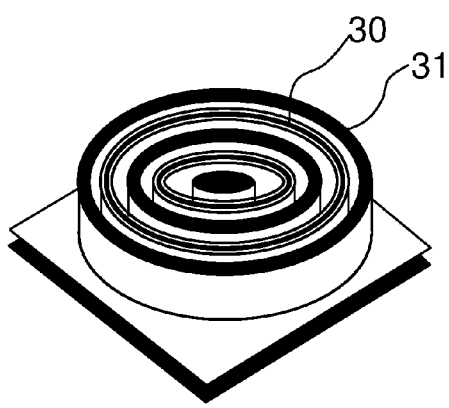
Figure 3D:
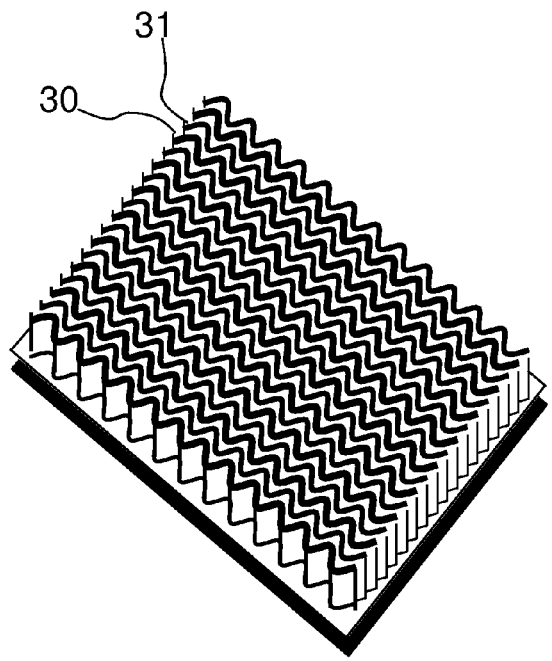
Figure 5A:
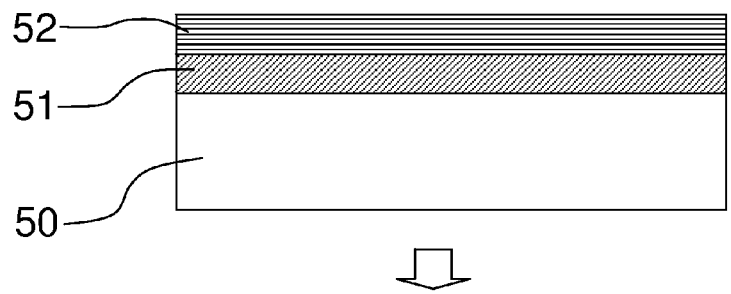
FIGS. 5A-5D depict a schematic representation of a process for manufacturing a backbone structure using a subtractive electrochemical etch process, according to an embodiment of the invention.
Figure 5B:
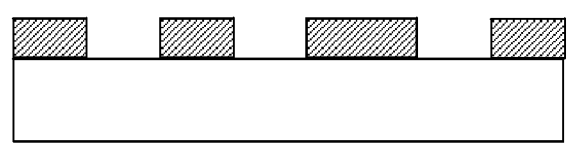
Figure 5C:
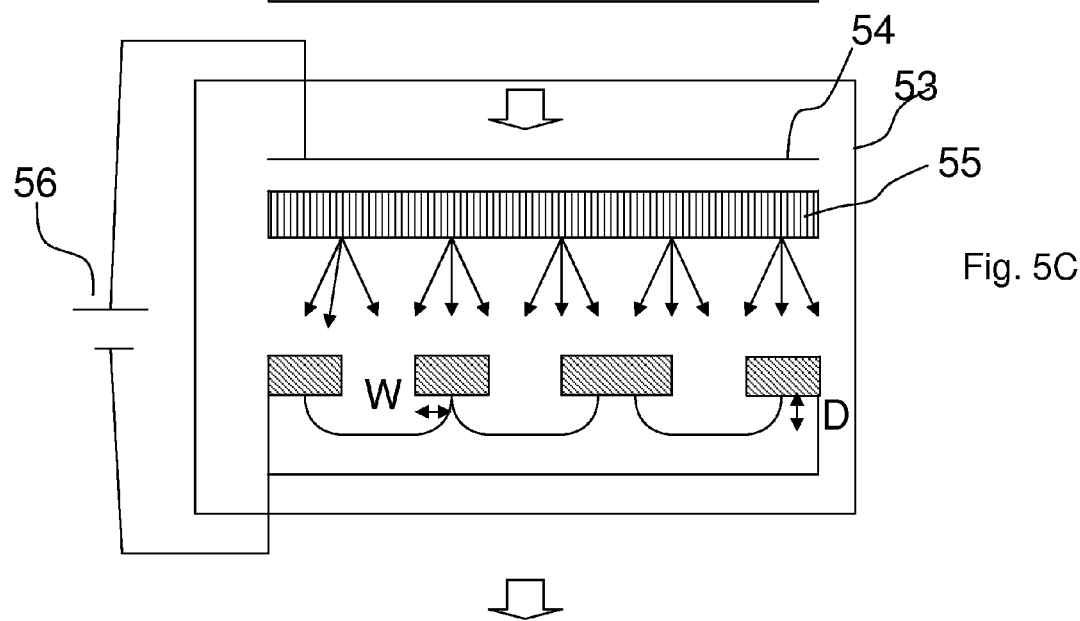
Figure 5D:
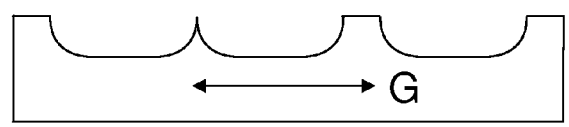

Some examples of three-dimensional architectures that are capable of use with certain embodiments of the present invention, and that have cathodes and anodes protruding from the same backplane, are shown in FIGS. 3A-3D. FIG. 3A shows a three-dimensional assembly with cathodes and anodes in the shape of pillars, FIG. 3B shows a three-dimensional assembly with cathodes and anodes in the shape of plates, FIG. 3C shows a three-dimensional assembly with cathodes and anodes in the shape of concentric circles, and FIG. 3D shows a three-dimensional assembly with cathodes and anodes in the shape of waves. Other configurations, such as honeycomb structures and spirals might also be used with certain embodiments of the present invention. In FIGS. 3A-3D, cathodes 30 and anodes 31 protrude from the same backplane and are alternating in a periodic fashion. However, in other embodiments the cathodes 30 may protrude from a different backplane than anodes 31.

FIGS. 4A-4E depict a schematic representation of an overall process flow for manufacturing a backbone structure using a subtractive reactive ion etch process according to certain embodiments. The process involves using a substrate 40 that may be shaped using a directional plasma source to form a volatile gaseous by-product, thereby facilitating its removal. A non-limiting example of the substrate 40 is one formed of silicon, which may be single-crystal or polycrystalline in nature. A masking layer 41 is deposited on top of the substrate 40 by methods such as vacuum deposition, thermal oxidation, surface coating, and wet chemical deposition. In the case of silicon as the substrate 40, a thermally grown silicon dioxide layer of a particular thickness may serve as the masking layer 41. This layer 41 may be subsequently patterned by standard patterning techniques such as lithography in order to provide a pattern suitable for further processing to create the backbone structure. In some embodiments of the invention, the masking layer 41 may be covered with a second masking layer 42 that is used to pattern the first masking layer 41 (see FIGS. 4A-4B). In this case, the first masking layer 41 is patterned by using the second masking layer 42 as a stencil (see FIG. 4C). For the silicon/silicon dioxide case, a standard photoresist may be used as the second masking layer 42. The second masking layer 42 may be patterned with standard optical lithography techniques. The second masking layer 42 may be selectively removed using selective wet or dry methods, leaving behind the patterned first masking layer 41 (see FIG. 4D). This combination of the substrate 40 and the patterned first masking layer 41 is subjected to a directional plasma 43 in a controlled environment in order to transfer the image of the first masking layer 41 onto the substrate 40 (see FIG. 4D). This reactive etch process in the presence of a directional plasma source may provide excellent anisotropic etching of the substrate 40 while etching the masking layer 41 itself at a very low rate. After the reactive etch of the substrate 40 is substantially complete, the masking layer 41 may be removed to leave the patterned substrate 40 behind, thereby forming the backbone structure (see FIG. 4E).

The following example further explains concepts described with reference to FIGS. 4A-4E. Single-crystal or polycrystalline silicon may be used as the substrate 40 that may be etched directionally in the presence of a plasma. The first masking layer 41 may be a thermally grown silicon dioxide layer of a particular thickness. A standard photoresist, such as AZ4620™ and AZP4620™ (commercially available from Clariant Corporation), may be used as the second masking layer 42. This layer 42 may be spin coated on top of the silicon dioxide layer, and subsequently patterned with standard optical lithography techniques. The areas of the photoresist that are exposed to light may be developed away using a developer solution, such as AZ400K™ (commercially available from Clariant Corporation). This patterned structure is dipped in a solution of HF, $NH_3F$, and water (Buffered Oxide Etch), wherein exposed silicon dioxide surfaces are dissolved. The remaining photoresist may be selectively removed by using a compatible organic solvent, such as N-methyl-2-Pyrrolidone, leaving behind the patterned silicon dioxide layer. This combination of the silicon and patterned silicon dioxide may be subjected to a directional fluoride plasma source in order to etch an image of the silicon dioxide layer onto the substrate 40. The directionality of the plasma 43 is controlled by a bias voltage between an anode and a cathode in a conventional plasma reactive ion etcher. A difference in rate between etch of silicon and silicon dioxide causes a pattern to be transferred to the substrate 40 without much etching in a lateral direction. After the reactive etch of silicon is substantially complete, the masking layer 41 may be removed by immersion in the Buffered Oxide Etch solution to leave the patterned substrate 40 behind. In some cases, a stop layer can be added to the bottom of the substrate 40 to facilitate complete etching and isolation of the cathode and anode backbone structures.

In some embodiments, the patterned substrate 40 is electrically conductive, in which case the resulting backbone structure is ready for further processing of active materials. In certain other embodiments, the backbone structure is electrically non-conductive. In this case, further processing by deposition of a conductive layer may be performed by various methods.

FIGS. 5A-5D depict a schematic representation of a process for manufacturing a backbone structure using a subtractive electrochemical etch process according to certain embodiments. In these particular embodiments, a substrate 50 is patterned using a electrically insulating masking layer 51 that is deposited on top of the substrate 50 by methods such as vacuum deposition, thermal oxidation, surface coating, and wet chemical deposition. This layer 51 is subsequently patterned by standard patterning techniques such as lithography in order to provide a pattern suitable for further processing to create the backbone structure. In some embodiments of the invention, the masking layer 51 is covered with a second masking layer 52 that is used to pattern the first masking layer 51 (see FIGS. 5A-5B). In this case, the first masking layer 51 is patterned by using the second masking layer 52 as a stencil. The second masking layer 52 is selectively removed using selective wet or dry methods, leaving behind the patterned first masking layer 51 (see FIG. 5B). The combination of the substrate 50 and the first masking layer 51 is placed in an electrochemical cell 53 that has a counter electrode 54 and a nozzle 55 that delivers a solution used to electrochemically remove a material in areas that are exposed to the solution (see FIG. 5C). In certain embodiments, the whole workpiece may be dipped into the solution that may dissolve the material that is in contact with the solution. However, the illustrated process may be more isotropic in nature, and typically an amount of material removed in the depth direction D may be substantially the same as the amount of material removed in each side of the width direction W. A dip-tank solution may be used for making features in which gaps G in the resulting backbone structure are significantly narrower than the width W. A DC power source 56 may be used to apply a potential that is sufficient to remove the material in contact with the solution. The process is substantially complete when essentially the desired amount of material is removed, which may be controlled based on the rate of etching that has been previously determined. In certain other cases, a current may be monitored, and a drop in the current may correspond to an endpoint of the electrochemical reaction. After the reaction is substantially complete, the workpiece is removed, and the masking layer 51 may be removed to leave the patterned substrate 50 behind, thereby forming the backbone structure.

The following example further explains concepts described with reference to FIGS. 5A-5D. One example of the substrate 50 for electrochemical patterning is a copper sheet. A sheet of the desired thickness may be used as the substrate 50, and may be patterned using the electrically insulating masking layer 51 (e.g., AZ4620™ or AZP4620™ photoresist) that is deposited on top of the substrate 50 by spin coating. This layer 51 may be exposed to light in the presence of a photomask that blocks light to areas in which the resist should be left behind. The workpiece may be placed in a solution that selectively removes the exposed areas. The combination of the substrate 50 and the first masking layer 51 is placed in the electrochemical cell 53 that has the counter electrode 54 (e.g., platinum) and the nozzle 55 that delivers the electrochemical etch solution used to electrochemically remove the metal in areas that are exposed to the solution. A combination of 10 wt % sulfuric acid and 1 wt % hydrogen peroxide may be delivered through the nozzle 55 to the workpiece. The DC power source 56 may be used to apply an anodic potential to the substrate 50, which removes copper in areas where the solution comes in contact with the copper anode and the platinum cathode at the same time, thereby forming a local electrochemical cell. After the reaction is substantially complete, the workpiece may be removed, and the masking layer 51 may be removed with N-methyhl-2-pyrrolidone to leave the patterned substrate 50 behind.

Figure 6A:
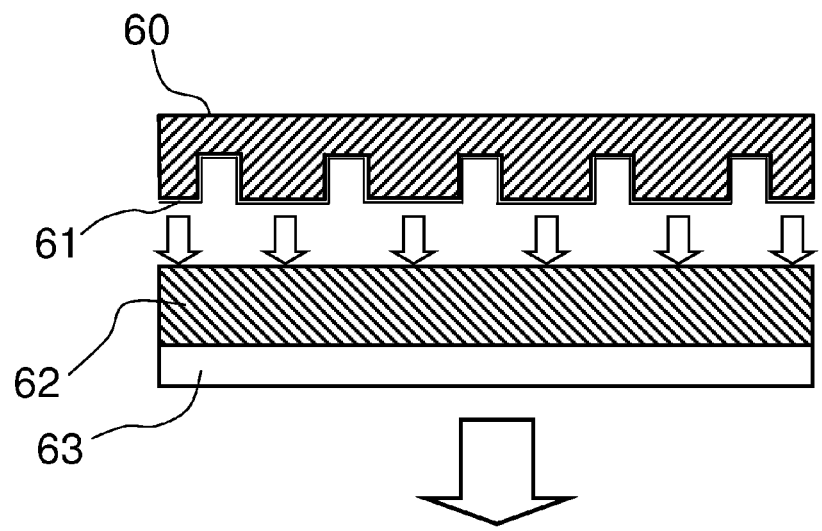
FIGS. 6A-6C depict a schematic representation of a process for manufacturing a backbone structure using a subtractive stamping process, according to an embodiment of the invention.
Figure 6B:
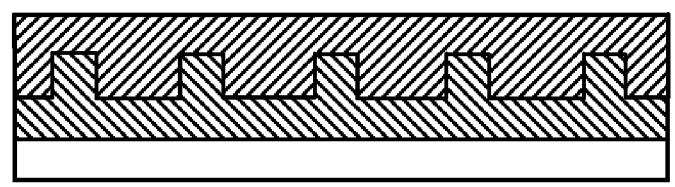
Figure 6C:
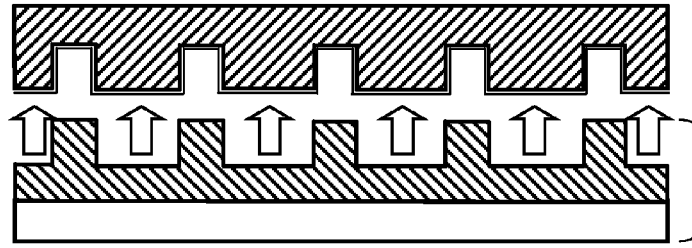

FIGS. 6A-6C depict a schematic representation of a process for manufacturing a backbone structure using a subtractive stamping process according to certain embodiments. A mandrel 60 is pre-fabricated with patterns that are inverted from a desired backbone pattern, and the mandrel 60 is coated with a thin release layer 61 that may be used to facilitate removal of the mandrel 60 after processing. The release layer 61 may be, for example, an organic material that may be vapor-deposited uniformly into three-dimensional features. This material may have additional properties of having either poor adhesion or the ability to be selectively etched without etching the mandrel 60 or a backbone material. For example, a stainless steel mandrel coated with a thin layer of copper deposited by chemical vapor deposition may act as an adequate stamping device for a process where a material that is used as a mold is thermally curable photoresist (see FIG. 6A). The combination of the mandrel 60 and the release layer 61 is contacted with a sheet of moldable material 62 that is on top of a substrate 63. Pressure is applied in order to transfer the pattern to the moldable material 62 (see FIG. 6B). This combination is hardened by curing into place the moldable material 62 using temperature or other means, such as light, in case the substrate 63 is transparent. The release layer 61 is removed by suitable means while separating the mandrel 60 and the resulting backbone structure that includes the molded material and the substrate 64 (see FIG. 6C).

In certain other embodiments of the invention, additive processes may be used to process a backbone structure of an energy storage device. FIGS. 7A-7D depict a schematic representation of a process for manufacturing the backbone structure using an additive electrochemical deposition process according to certain embodiments. This process may be referred to as a LIGA process in the art, which in German stands for "lithography, galvano-forming and molding (Abformung)." In this process, a conductive or non-conductive substrate 70 is used. In case of a non-conducting substrate, a conducting layer 71 is deposited. Photoresist 72 is coated on top of this substrate 70, and is patterned by standard lithography techniques using a photomask 73 to leave behind the photoresist 72 in areas where a backbone material is not to be deposited (see FIGS. 7A and 7B). The workpiece is placed in an electroplating bath with a potential enough to reduce metallic ions present in solution to form a metal 74 (see FIG. 7C). The metallic ions are reduced at a conductive surface and are not deposited where the photoresist 72 is present. When the process is substantially complete, the workpiece including components 70, 72, and 74 is removed from a plating cell, and the photoresist 72 is removed to leave the backbone structure (including components 70 and 74) behind (see FIG. 7D).

The following example further explains concepts described with reference to FIGS. 7A-7D. In this process, a silicon wafer may be used as the semi-conductive substrate 70. Copper may be deposited using sputter deposition to create the conductive layer 71 on top of the silicon. A positive or negative tone photoresist 72 (e.g., AZ4620™ or AZP4620™) may be coated on top of this substrate 70 and patterned by standard lithography techniques to leave behind the photoresist 72 in areas where a backbone material is not to be deposited. This workpiece may be placed in a nickel electroplating bath including 1 M nickel sulfate, 0.2 M nickel chloride, 25 g/l boric acid, and 1 g/l sodium saccharin, along with a platinum counter electrode and a potential enough to reduce nickel ions present in the solution to Ni metal 74. The metal ions are reduced at a conductive surface and are not deposited where the photoresist 72 is present. When the process is substantially complete, the workpiece including the silicon wafer 70, photoresist 72, and nickel metal 74 may be removed. Subsequently, the photoresist 72 may be removed using N-methyhl-2-pyrrolidone to leave the backbone structure including components 70 and 74 behind. The remaining copper metal in the area where the photoresist 72 was present may be removed by a chemical etch involving 2% sulfuric acid and 1% hydrogen peroxide.

FIGS. 8A-8E depict a schematic representation of a process for manufacturing a backbone structure using an additive extrusion process according to certain embodiments. A mandrel 80 is pre-fabricated with patterns that are inverted from a desired backbone pattern, and the mandrel 80 is coated with a thin release layer 81 that may be used to facilitate removal of the mandrel 80 after processing (see FIG. 8A). This mandrel 80 also has openings either at the edges or on top of each opening 85 in order to facilitate the addition of a material that may be made into a mold. The release layer 81 may be, for example, an organic material that may be vapor-deposited uniformly into three-dimensional features. This material may have additional properties of having either poor adhesion or the ability to be selectively etched without etching the mandrel 80 or a backbone material. For example, a stainless steel mandrel coated with a thin layer of copper deposited by chemical vapor deposition may act as an adequate stamping device for a process where a material that is used as the moldable material 82 is a thermally curable photoresist. The combination of the mandrel 80 and the release layer 81 is contacted with a substrate 83 (see FIG. 8B). The moldable material 82 is extruded into the openings 85 and filled (see FIG. 8C). Any residual material within the openings 85 is cleaned out at this time (see FIG. 8D). This combination is hardened by curing into place the moldable material 82 using temperature or other means, such as light, in case the substrate 83 is transparent. The release layer 81 is removed by suitable means while separating the mandrel 80 and the resulting backbone structure that includes the molded material 82 and the substrate 83 (see FIG. 8E). Depending on the requirements of each particular implementation, release layer 81 may not be necessary (e.g., if the mandrel/mold 80 itself satisfies the required characteristics that would otherwise be satisfied by a release layer). In certain embodiments, the mandrel/mold 80 may be released by dissolution.

Figure 9A:
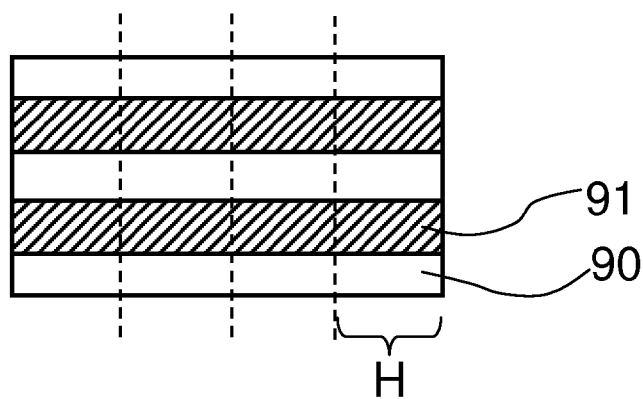
FIGS. 9A-9C depict a schematic representation of a process for manufacturing a backbone structure using a sequential deposition and assembly process, according to an embodiment of the invention.
Figure 9B:
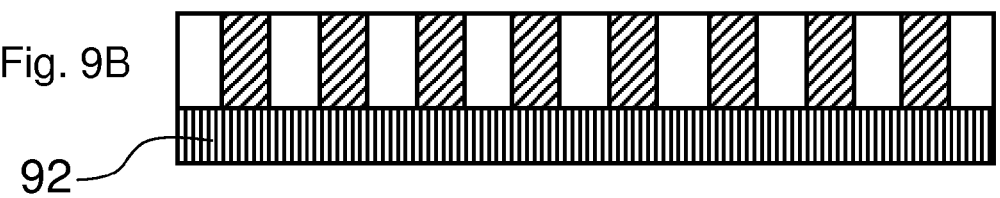
Figure 9C:
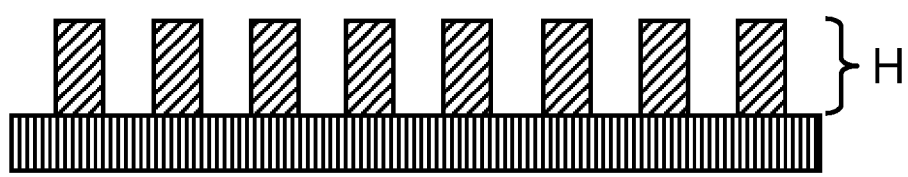

FIGS. 9A-9C depict a schematic representation of an exemplary process for manufacturing a backbone structure using a sequential deposition and assembly process according to certain embodiments. In this process, alternating layers of backbone material and a sacrificial material are assembled. An example of a set of materials that may be assembled together are sheets of polyethylene terephthalate (PET) 90 interspersed with copper foils 91. The resulting stack thus includes PET/copper/PET/copper/PET (see FIG. 9A). The layers are diced to a thickness substantially corresponding to a height of a backbone structure $\underline{H}$, spirally wound within their axes, and assembled onto a substrate 92 using epoxy glue (see FIG. 9B). A sacrificial PET layer is removed by selectively etching it away in a selective chemical etch solution containing sodium hypochlorite (NaOCl). This leaves behind two spirally wound copper substrates, one for cathode backbone and another for anode backbone with gaps in the middle which will house active materials and separators for an electrochemical energy device (see FIG. 9C).

Once a backbone structure is available, materials that are involved in electrochemical reactions, also called active materials, may be loaded onto the backbone structure. This may be done by several different methods. An anode backbone and a cathode backbone may be separate from each other, but each electrode may be electrically conductive by itself. This lends to electrochemical deposition techniques and electrophoretic deposition techniques as viable options for adding the active materials. For example, in the case of a lithium-ion battery, a cathode material, such as $LiCoO_2$, $LiNi_{0.5}Mn_{1.5}O_4$, $Li(Ni_xCo_yAl_z)O_2$, $LiFePO_4$, or $Li_2MnO_4$ may be electrophoretically deposited onto a conductive substrate. Electrophoretic deposition may also be performed for $V_2O_5$ films. Cathode materials may also be co-deposited along with a polypyrrole matrix. In addition, certain cathode materials for lithium-ion batteries may be electrochemically deposited, such as molybdenum oxysulfides. In certain embodiments, cathode formation comprises electrophoretic deposition of LiCoO2 until a layer thickness between 1 micron and 300 microns is formed. In certain embodiments, the layer thickness is between 5 microns and 200 microns, and in certain embodiments, the layer thickness is between 10 microns and 150 microns. With regards to anode materials, electrochemical deposition may be used for plateable anode materials, such as tin, electrophoretic deposition may be used to assemble graphite, and an electrophoretic resist deposition followed by pyrolysis may form a carbon anode. Other suitable anode materials may include titanates, silicon, and aluminum. Similar layer thicknesses apply to anode formation as described above. Suitable separator materials may include polyethylenes, polypropylenes, $TiO_2$, $SiO_2$, $Al_2O_3$, and the like.

Figure 10:
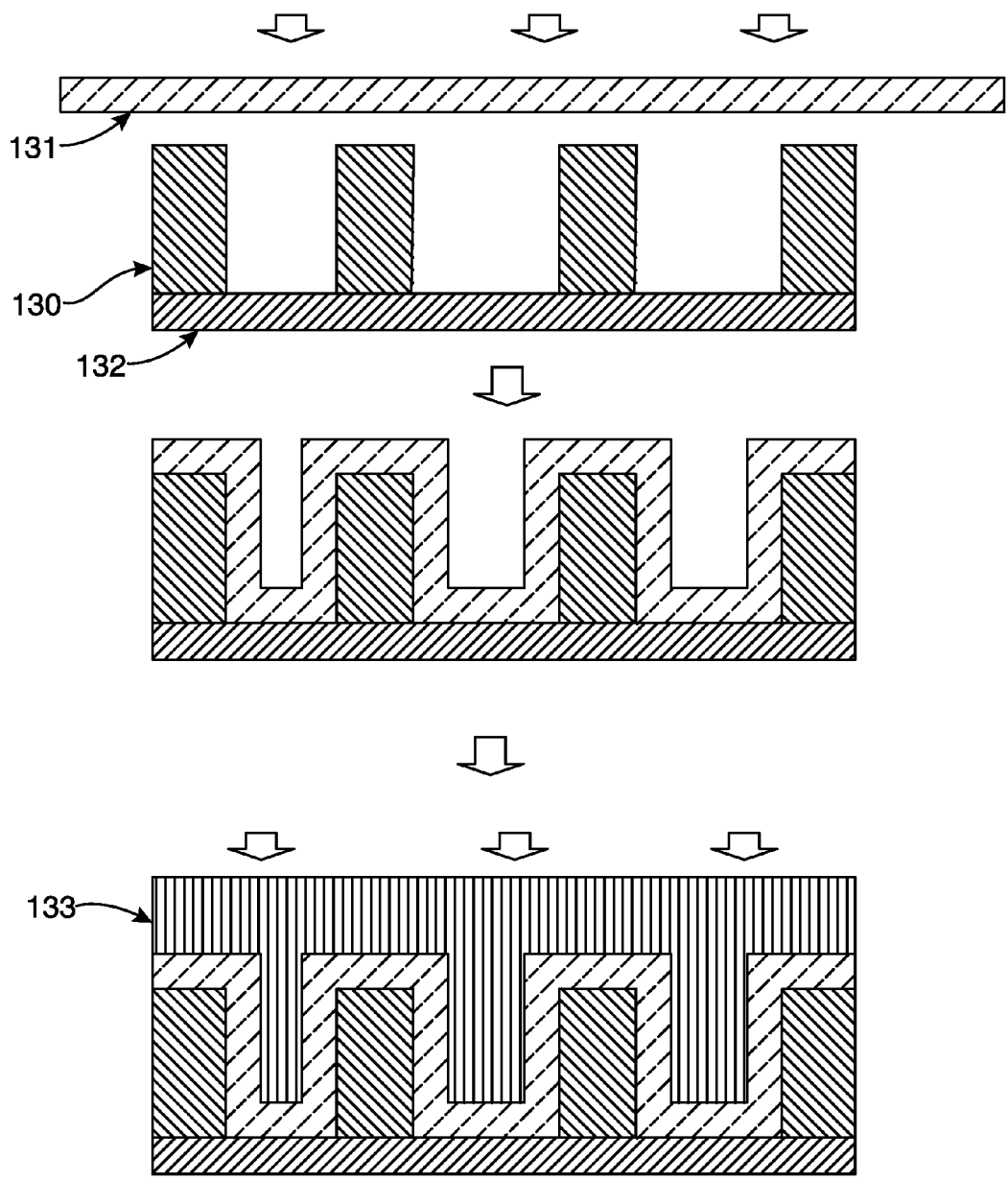
FIG. 10 is a representation of a process for assembling a separator in a three dimensional cell using a solid film vacuum suction process, according to an embodiment of the invention.

FIG. 10 shows an example of a method for adding a separator 131 to a three dimensional architecture. In this case, a substrate and current collector 132 has an anode 130 pre-patterned on it. A sheet of the separator 131 is laid on top of the anode 130, and this assembly is kept in a closed vacuum chamber. A vacuum level is slowly increased to drive an air gap between anode pillars. This causes the separator 131 to conformally coat the anode 130. At this point, this assembly can be removed from the vacuum chamber, and a cathode 133 can be assembled on top in order to make a three dimensional battery. In another embodiment, various components can all be loaded after mechanical alignment into the vacuum chamber in order to assemble the battery.

A class of materials that can be used as separators for aqueous and non-aqueous energy storage systems is spin-on dielectrics. A spin-on dielectric can be used as porous barriers between a cathode and an anode in a battery. Some examples are phosphosilicates. MSQ (Methyl-Silsesquioxane), SILK™, and so forth. Many of these materials can be spun on and subsequently cured to form a consistent porous film.

Figure 11:
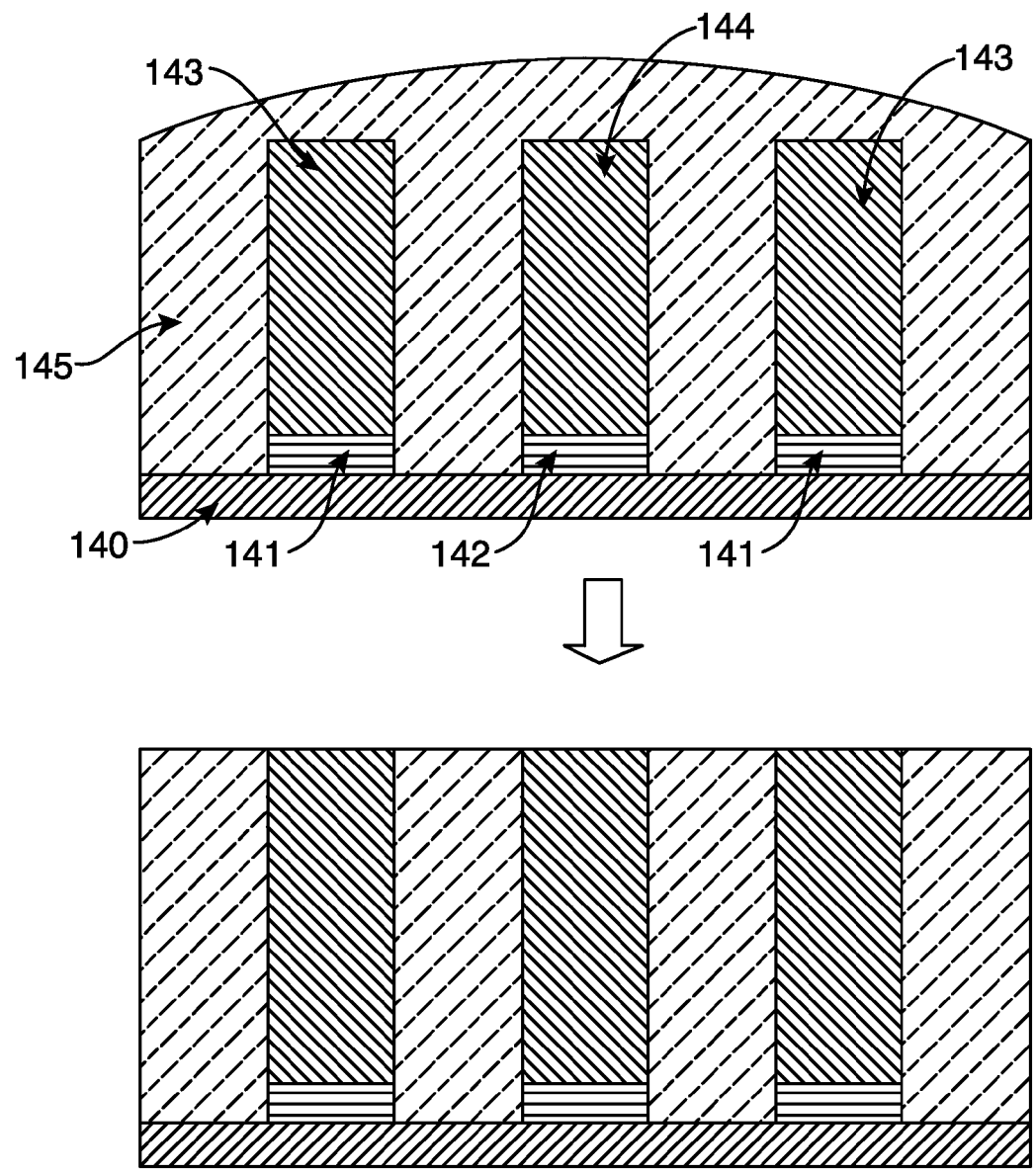
FIG. 11 is a schematic of a process to use a spin-on dielectric for its use as a separator in a coplanar battery, according to an embodiment of the invention.

FIG. 11 shows an example of processing a spin-on dielectric on a co-planar three dimensional battery. A substrate 140 has an anode current collector 141 and a cathode current collector 142, on top of which an anode 143 and a cathode 144 sit, respectively. This assembly is then subjected to spin coating of a spin-on glass dielectric 145 and is planarized by spinning at a suitable rate to provide planar films. A resulting porosity can then be obtained on the dielectric 145 by thermal or light-assisted curing. Alternatively, or in conjunction, a spin-on glass can be initially molded into a desired shape and pitch using a sacrificial mold. After setting the spin-on glass, the mold can be removed using a standard mold removal technique. The anode 143 and the cathode 144 can subsequently be assembled into a grid of the resulting separator.

Figure 12:
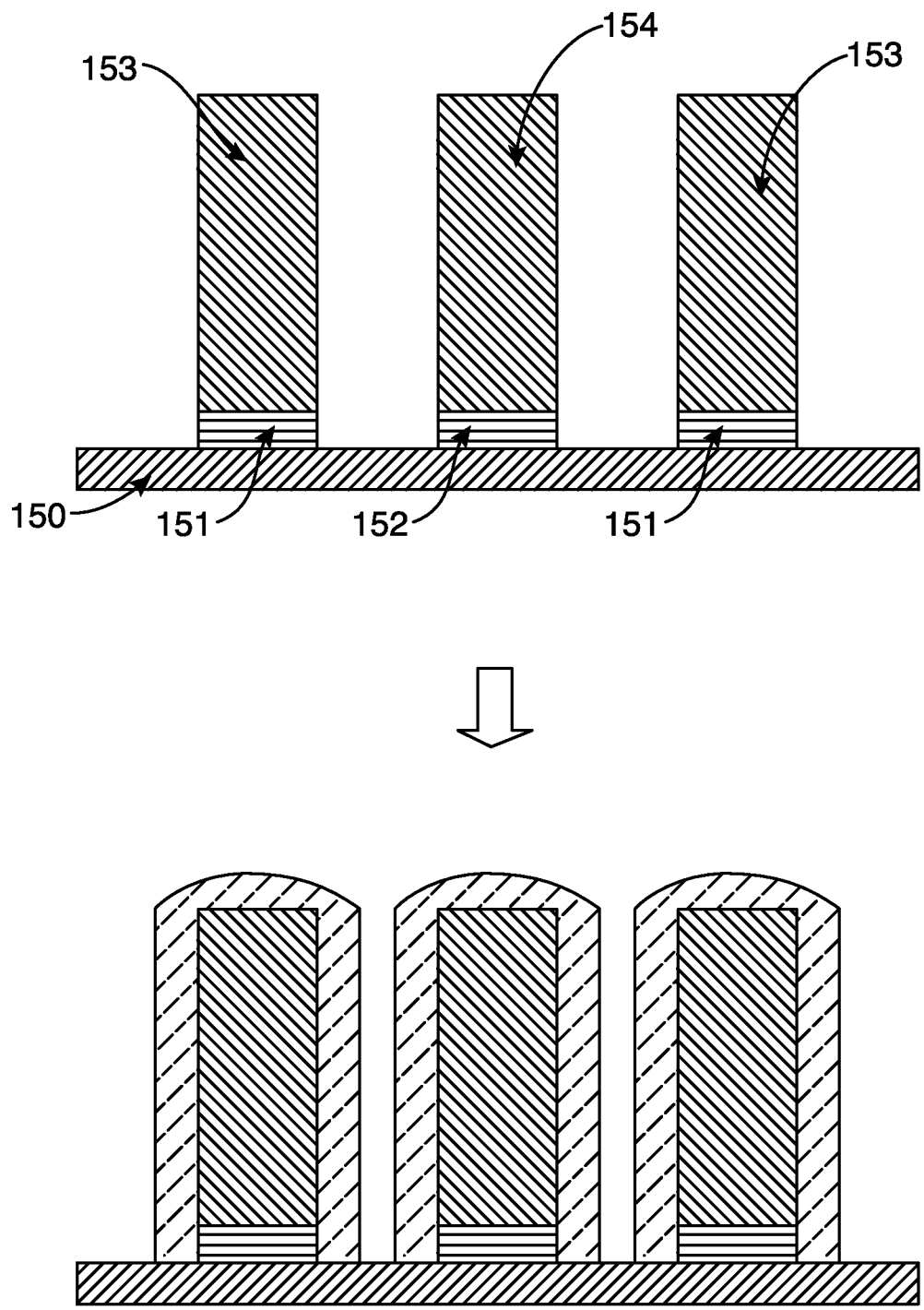
FIG. 12 is a schematic of a separator deposition process using electrophoretic deposition, according to an embodiment of the invention.

Another method that can be used for forming separators is electrophoretic deposition of separator materials. Electrophoretic deposition is typically a potential driven phenomenon where particles of non-conducting or poorly conducting materials are driven to either a cathode or an anode by an applied voltage. Thick films can be deposited by this technique. Also, the films can be tailored to different porosities by adding different amounts of sacrificial binders that can be co-deposited electrophoretically and subsequently driven off by temperature. Due to surface driven effects, the deposition is typically self-limiting. Therefore, a thickness and an available separator spacing can be optimized in order to get full coverage between the cathode and the anode. This process is schematically shown in FIG. 12. In particular, a substrate 150 has an anode current collector 151 and a cathode current collector 152, on top of which an anode 153 and a cathode 154 sit, respectively. This assembly is then immersed in an electrophoretic deposition bath that has a separator material and a desired concentration of a binder for providing porosity. Deposition is carried out by using high voltage DC power supplies (e.g., about 10-150 V).

Figure 13:
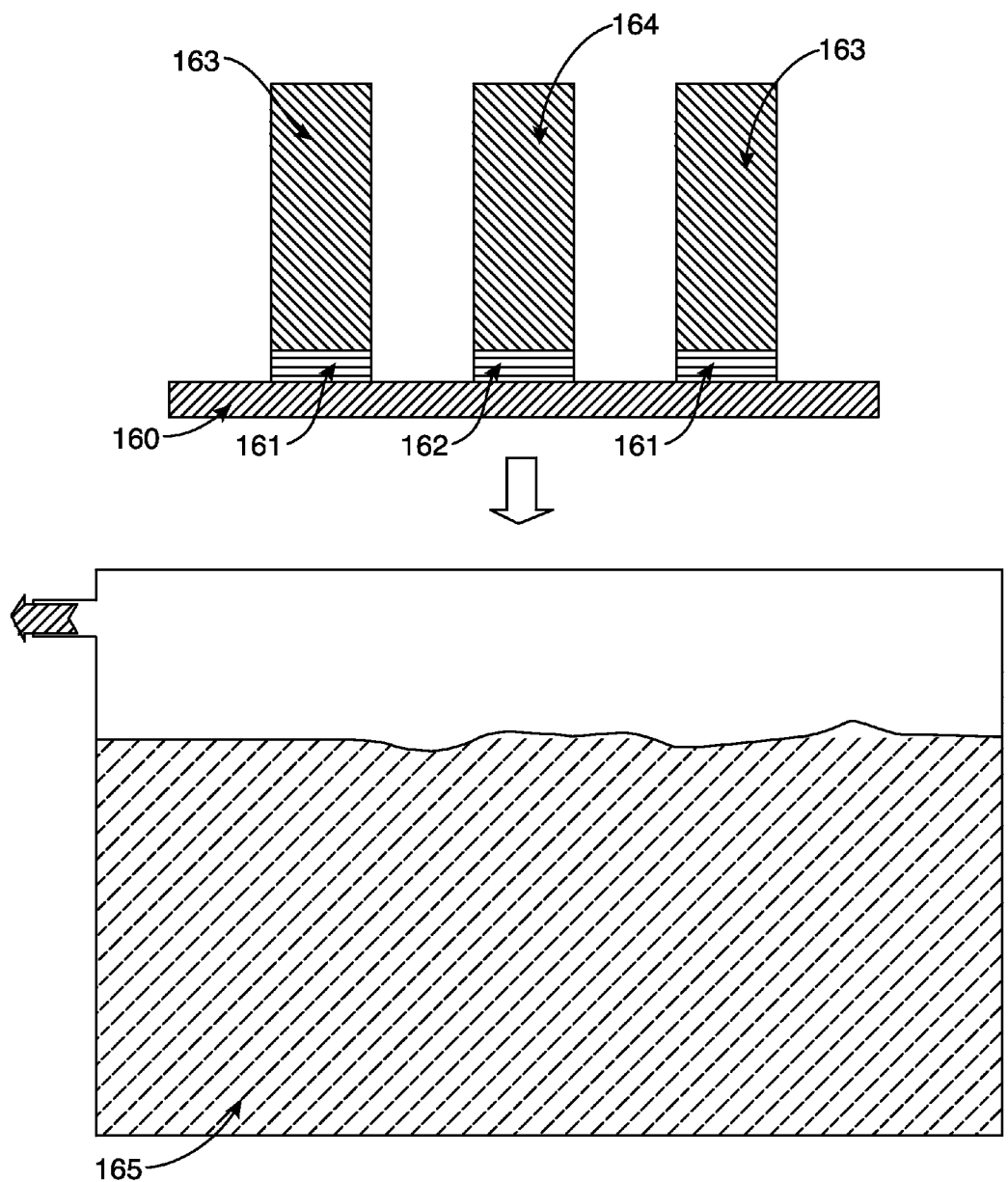
FIG. 13 is a graphical representation of a separator deposition process using an immersion/vacuum technique, according to an embodiment of the invention.

Yet another way to deposit separator materials is to use a liquid solution of polyolefins or any other material of interest that can be made into a liquefied form in temperatures less than about 100° C. An assembly can be immersed into a solution containing the liquefied material, and a vacuum is pulled into a top of a chamber in order to till up crevices with the liquefied material. Once the vacuum is sufficient, the solution can wick into the crevices and can displace air in the crevices. In addition, when the vacuum is released, any residual bubbles that are present can expand sufficiently so that they will be forced out to be displaced by the liquefied material. A schematic of this process is shown in FIG. 13. In particular, a substrate 160 has an anode current collector 161 and a cathode current collector 162, on top of which an anode 163 and a cathode 164 sit, respectively. This assembly is then immersed in a solution 165 containing a liquefied material.

Figure 14:
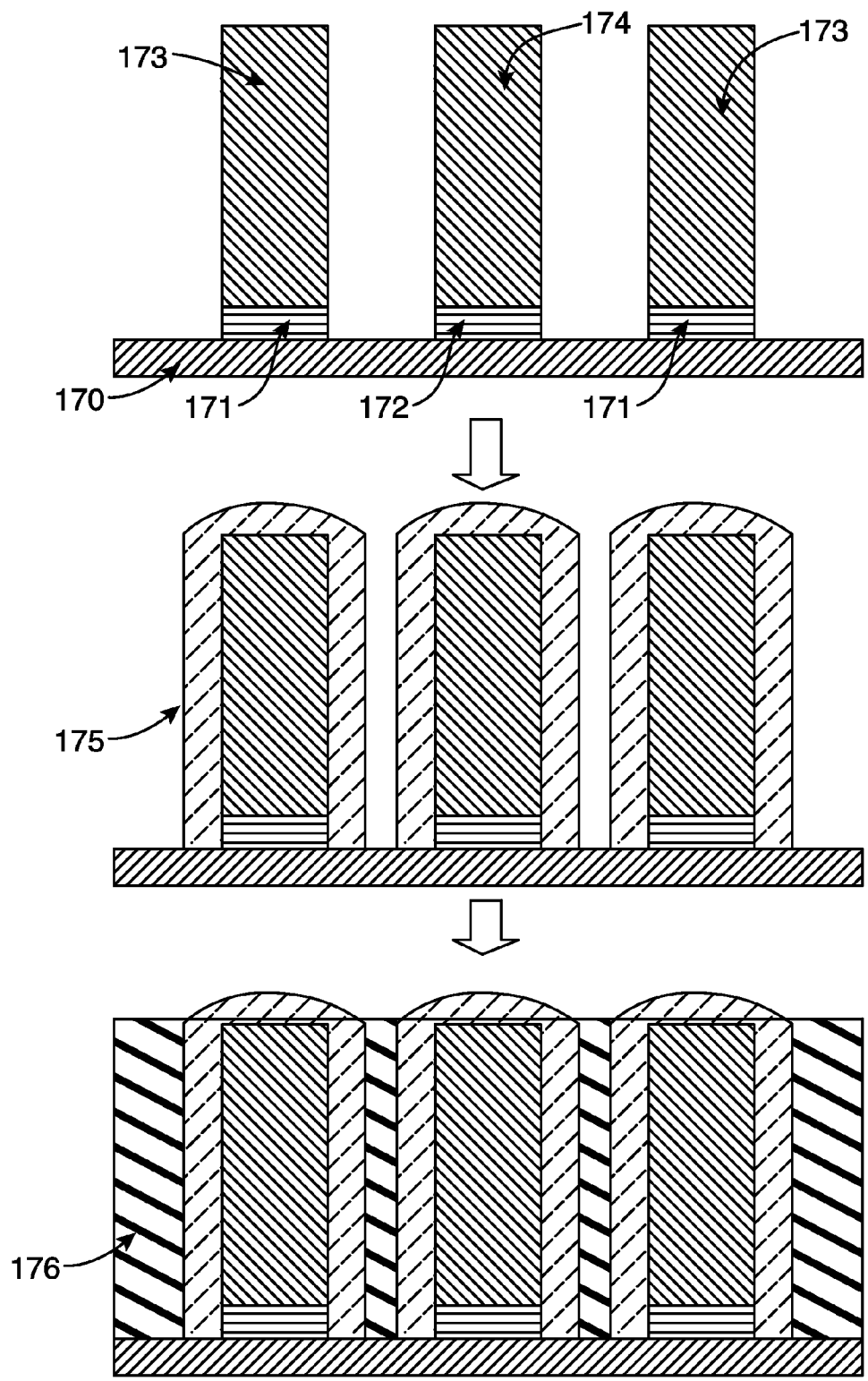
FIG. 14 illustrates a structure of a separator deposited by a bi-layer deposition method, first using chemical vapor deposition and then using a conventional dip coating, according to an embodiment of the invention.

FIG. 14 shows a two-operation process for deposition of a separator material, In particular, a substrate 170 has an anode current collector 171 and a cathode current collector 172, on top of which an anode 173 and a cathode 174 sit, respectively. The first operation is a chemical vapor deposition process, which adds thin layers of a porous material 175 around the exposed electrodes 173 and 174. This material 175 is then solidified by drying, and the assembly then gets a second coating of the same or a different material 176 by spin-on methods or by immersion in vacuum.

One point to be noted is that a resulting separator need not be formed from a single sheet of material. When the separator is formed from a single sheet of material that is mechanically compressed in order to make a battery, any sort of defect present may be magnified during mechanical compression. On the other hand, in a three dimensional structure as shown in FIGS. 11-14, two coincident defects would have to be substantially proximate in the deposited separator in order to have electrical shorts. This will greatly reduce a probability of separator-related shorting defects in a battery. Similarly, for the separator shown in FIG. 7, more than two (e.g., three or four) defects would have to be substantially proximate for electrical shorts to occur, which reduces the probability even further.

While some embodiments have been described with reference to energy storage devices, it should be recognized that the backbone structures described herein may be useful in various other types of devices to provide increased surface area per unit geometrical area (or per unit weight or volume). These other types of devices may involve various types of processes during their operation, such as heat transfer, chemical reactions, and diffusion.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A three-dimensional non-aqueous battery, comprising:
   a battery enclosure;
   a first structural layer within the battery enclosure, the first structural layer having a planar surface;
   a first plurality of conductive protrusions directly connected to and extending at least about 50 microns in a first direction from the planar surface of the first structural layer and having an aspect ratio of approximately 2.5:1 to 500:1;
   a first plurality of cathodes and a first plurality of anodes within the battery enclosure, each of the first plurality of cathodes and first plurality of anodes being directly connected to and in electrical contact with an outer surface of one of said first plurality of conductive protrusions, the first plurality of cathodes having a thickness of 5 to 200 microns; and
   a porous separator material between the first plurality of cathodes and the first plurality of anodes, whereby the first plurality of cathodes are in ionic connection to the first plurality of anodes through the porous separator material.

2. The three-dimensional battery of claim 1, further comprising:
   a second structural layer within the battery enclosure, said second structural layer having a second surface;
   a second plurality of conductive protrusions directly connected to and extending from said second surface of said second structural layer; and
   a second plurality of electrodes within the battery enclosure, each of the second plurality of electrodes being directly connected to and in electrical contact with an outer surface of one of said second plurality of conductive protrusions.

3. The three-dimensional battery of claim 2, the second plurality of electrodes consisting of a second plurality of anodes.

4. The three-dimensional battery of claim 2, the second plurality of electrodes consisting of a second plurality of cathodes.

5. The three-dimensional battery of claim 1, wherein said first plurality of conductive protrusions surround a base material protruding from said first surface of said first structural layer.

6. The three-dimensional battery of claim 5, wherein said base material and said first structural layer comprise the same material.

7. The three-dimensional battery of claim 1, wherein each of said first plurality of electrodes comprises a layer overlying the outer surface of one of said first plurality of conductive protrusions.

8. The three-dimensional battery of claim 1, wherein said first plurality of conductive protrusions comprise fins protruding at least 50 microns from said first structural layer and having a thickness smaller than 20 microns.

9. The three-dimensional battery of claim 1, wherein said first plurality of conductive protrusions comprise pillars protruding at least 50 microns from said first structural layer.

10. The three-dimensional battery of claim 6, wherein each of said first plurality of electrodes comprises a layer overlying the outer surface of one of said first plurality of conductive protrusions.

11. The three-dimensional battery of claim 6, wherein said first plurality of conductive protrusions comprise fins protruding at least 50 microns from said first structural layer and having a thickness smaller than 20 microns.

12. The three-dimensional battery of claim 6, wherein said first plurality of conductive protrusions comprise pillars protruding at least 50 microns from said first structural layer.

13. The three-dimensional battery of claim 9, each of said pillars being substantially cylindrical.

14. The three-dimensional battery of claim 12, each of said pillars being substantially cylindrical.

15. The three-dimensional battery of claim 2, wherein said second plurality of conductive protrusions is electrically insulated from said first plurality of conductive protrusions.

16. The three-dimensional battery of claim 1, wherein each of the first plurality of conductive protrusions that is contacted by one of the first plurality of cathodes is discontinuous from each of the first plurality of conductive protrusions that is contacted by one of the first plurality of anodes.

17. A three-dimensional non-aqueous battery, comprising:
a backplane having a planar surface;
a first plurality of anodes directly connected to and extending from the backplane planar surface in a first direction;
a first plurality of cathodes having a thickness of 5 to 200 μm directly connected to and extending from the backplane planar surface in the first direction;
an anode current collector for the first anode and a cathode current collector for the first cathode; and
a porous separator material between the first cathode and the first anode to allow ionic connection between the first plurality of anodes and the first plurality of first cathodes,
wherein at least one of the anode and cathode current collectors is non-planar, and extends at least about 50 microns from the backplane planar surface, and has an aspect ratio of approximately 2.5:1 to 500:1.

18. The three-dimensional battery of claim 17, comprising a plurality of anodes that protrude from the backplane, the plurality of anodes including the first anode, each member of the plurality of anodes being electrically separated from the first cathode.

19. The three-dimensional battery of claim 18, comprising a plurality of cathodes that protrude from the backplane, the plurality of cathodes including the first cathode, each member of the plurality of anodes being electrically separated from each member of the plurality of cathodes.

20. The three-dimensional battery of claim 18, wherein the plurality of anodes is associated with the at least one current collector to form a non-planar active battery component.

21. The three-dimensional battery of claim 19, wherein the plurality of cathodes is associated with the at least one current collector to form a non-planar active battery component.

22. The three-dimensional battery of claim 20, wherein a surface area of the non-planar active battery component is greater than twice a geometrical footprint of the backplane.

23. The three-dimensional battery of claim 21, wherein a surface area of the non-planar active battery component is greater than twice a geometrical footprint of the backplane.

24. The three-dimensional battery of claim 17 wherein the first anode has a thickness of 5 to 200 μM.

25. The three-dimensional battery of claim 17 wherein the first anode has a thickness of 10 to 150 μM.

26. The three-dimensional battery of claim 17 wherein the first cathode has a thickness of 10 to 150 μM.

27. The three-dimensional battery of claim 17 wherein the first anode has a thickness of 10 to 150 μM and the first cathode has a thickness of 10 to 150 μM.

28. The three-dimensional battery of claim 27 wherein the first anode comprises tin, silicon, or aluminum, or is a titanate.

29. The three-dimensional battery of claim 27 wherein the first anode comprises carbon.

30. The three-dimensional battery of claim 1 wherein the anodes comprised by the first plurality of electrodes have a thickness of 5 to 200 μM.

31. The three-dimensional battery of claim 1 wherein the anodes comprised by the first plurality of electrodes have a thickness of 10 to 150 μM.

32. The three-dimensional battery of claim 1 wherein the cathodes comprised by the first plurality of electrodes have a thickness of 10 to 150 μM.

33. The three-dimensional battery of claim 1 wherein the anodes comprised by the first plurality of electrodes have a thickness of 10 to 150 μM and the cathodes comprised by the first plurality of electrodes have a thickness of 10 to 150 μM.

34. The three-dimensional battery of claim 33 wherein the first anode comprises tin, silicon, or aluminum, or is a titanate.

35. The three-dimensional battery of claim 33 wherein the first anode comprises carbon.

36. The three-dimensional battery of claim 33 wherein the first anode comprises tin, silicon, or aluminum, or is a titanate.

37. The three-dimensional battery of claim 33 wherein the first anode comprises carbon.

* * * * *